United States Patent [19]

Brocklehurst

[11] 4,112,042
[45] Sep. 5, 1978

[54] MOULDING OF SYNTHETIC PLASTICS SHEET MATERIAL

[75] Inventor: Jack Brocklehurst, Woodlesford, Nr. Leeds, England

[73] Assignee: Plastona (John Waddington) Ltd., England

[21] Appl. No.: 749,280

[22] Filed: Dec. 10, 1976

Related U.S. Application Data

[63] Continuation of Ser. No. 514,093, Oct. 11, 1974, abandoned.

[30] Foreign Application Priority Data

Oct. 12, 1973 [GB] United Kingdom ............... 47848/73

[51] Int. Cl.² ...................... B29C 17/00; B29C 17/04
[52] U.S. Cl. ...................... 264/322; 264/93; 264/292; 264/323; 425/387.1; 425/398
[58] Field of Search ...................... 264/89, 90, 92, 93, 264/94, 292, 296, 320, 322, 323; 425/387.1, 388, 398, 399

[56] References Cited

U.S. PATENT DOCUMENTS

| 3,470,281 | 9/1969 | Knowles | 264/94 |
| 3,548,459 | 12/1970 | Dockery | 425/292 |
| 3,757,718 | 9/1973 | Johnson | 264/273 |
| 3,825,166 | 7/1974 | Padovani | 229/1 SB |

FOREIGN PATENT DOCUMENTS

1,182,969  6/1959  France ..................... 264/323

*Primary Examiner*—Jan H. Silbaugh
*Attorney, Agent, or Firm*—Wolf, Greenfield & Sacks

[57] ABSTRACT

A method for molding thermoformable synthetic plastic sheet material into a circular lid having a downturned rim with a bead on its inner face. The sheet material is softened by heating and disposed between male and female dies which are moved together to fold the sheet material over the male die to form the downturned rim. The material forming the rim is compressed and sheared between the dies to force material into a bead cavity in the male die to form the bead. The molded lid can fit over the top edge of a container with the bead in sealing engagement with the container.

2 Claims, 11 Drawing Figures

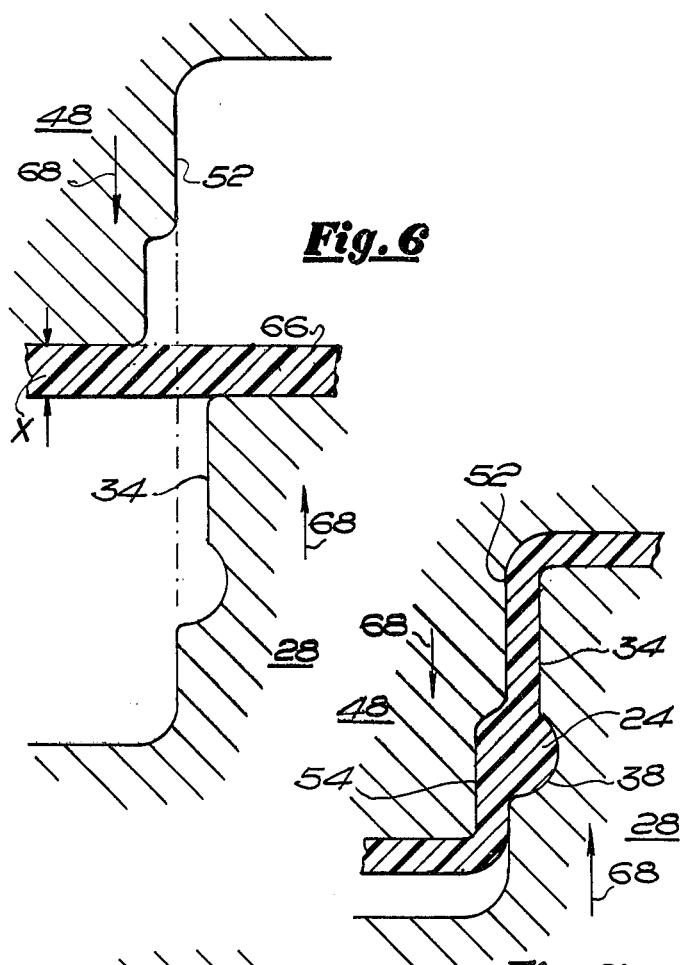
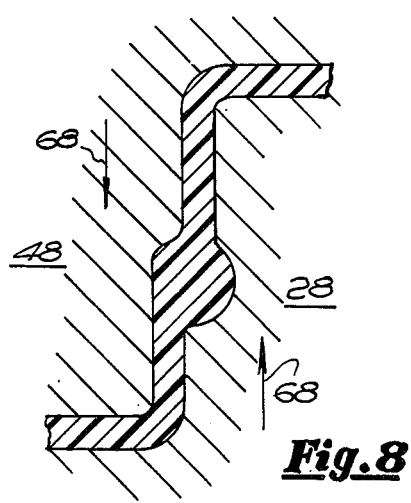

MOULDING OF SYNTHETIC PLASTICS SHEET MATERIAL

This is a continuation of application Ser. No. 514,093, filed Oct. 11, 1974, now abandoned.

This invention relates to the moulding of thermoformable synthetic plastics sheet material into components having a base from which extends upwardly or downwardly a peripheral wall or rim.

The invention is concerned primarily but not exclusively with the moulding of components such as containers and lids, such as are used in great numbers for containing foodstuffs, and for beverages.

It is well known that these components frequently require to have internal and/or external beads on the flange or wall, such beads being required for example in the case of lids for providing a means whereby the lid may be secured or held to a container.

Generally speaking, there are two well known techniques for the moulding of these components so that they have such internal and/or external beads. The first method is injection moulding and the second method is thermoforming. In the former technique, plastics material in a fluent state is injected into an appropriately shaped moulding cavity, whilst in the latter, plastics material in sheet form is softened under the action of heat and then is shaped by the application of air under pressure and/or by the application of a vacuum, to cause the soft sheet to become shaped to the mould surface. In the latter technique, it has been known to use a plug to assist in the moulding.

Injection moulding has the advantage that it is simply a matter of designing the mould to produce mouldings which have said beads, whereas in thermoforming, usually the component has a generally constant wall or flange thickness and both sides of the wall or flange have the same contour. This can be a disadvantage, as the component flange or wall, where the bead or beads is or are provided, may not have the necessary rigidity characteristics for the intended purpose. Injection moulding however, has the disadvantage that tooling costs are relatively high as compared with tooling costs for thermoforming.

This invention aims to achieve an advantage of injection moulding without the disadvantage of high tooling costs.

According to the invention, a method of moulding a component having a wall or rim from thermoformable synthetic plastics sheet material so that the wall or flange is provided with a thickened bead comprises softening the sheet material by heat and clamping the softened sheet material between forming dies to form at least a region of the wall or rim of the component, and at such region minimum clearance between the dies is less than the thickness of the sheet material, at least one of the dies has a bead forming cavity and the dies move relatively in an action tending to shear the material whereby at said region, excess soft plastics material is forced to mould to the shape of the bead cavity.

The component preferably is an annular component and although not necessarily circular, it usually will be, and the said excess plastics material may be forced into an annular recess of the cavity to form a bead (internal or external) on the component. The bead may be continuous and helical, in which case it will define a screw thread on the component wall or rim. Where the component is a lid, for example, for a margarine tub, the bead may be formed internally of a rim adapted to fit round the top of the tub so as to provide a means whereby the lid may be removably clipped to the top of the tub. The external surface of the rim may be provided with a shoulder to form a de-nesting ring where the lids are adapted to be stacked one on top of another.

The invention can be applied to any form of annular component and is useful when it is desired to provide, for example, a strengthening means in the interior or exterior (or both) of the container for strength purposes.

In one example, we have used sheet polypropylene of 30 thousandths of an inch thickness, and the said minimum clearance of the dies has been as little as 12 thousandths of an inch. Other suitable materials for use in the method are polystyrene and polyvinyl chloride.

The remainder of the component may be thermoformed if desired, although the centre of the component can be formed by clamping without shear, between the dies.

The invention also extends to components when moulded by the method.

According to a further aspect of the invention, there is provided a mould for moulding or a component having a wall or rim from thermoformable plastics sheet material comprising male and female mould parts of which at least one has a bead cavity in that part of the mould which defines the wall or rim of the container and which can be brought together so as to clamp therebetween the synthetic plastics sheet material to form a region of the component by squeezing and tending to shear the material to force it to fill the bead cavity.

An embodiment of the invention will now be described by way of example, with reference to the accompanying drawings wherein.

Figure 1:
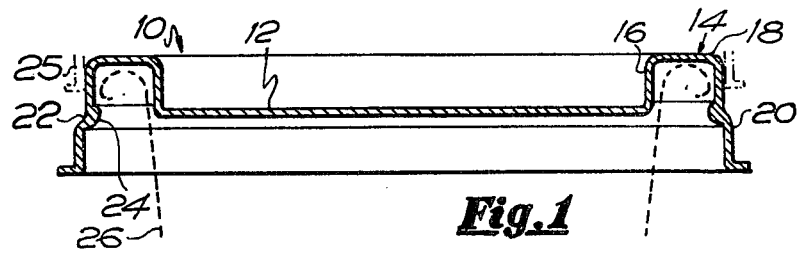
FIG. 1 is a sectional elevation of a lid produced in accordance with the present invention.
Figure 9:
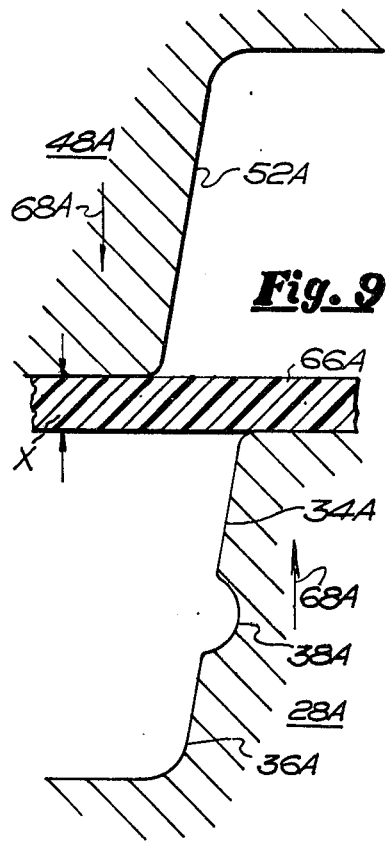
Figure 10:
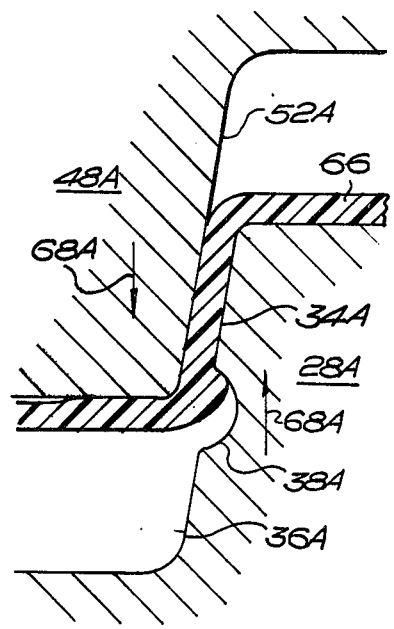
Figure 11:
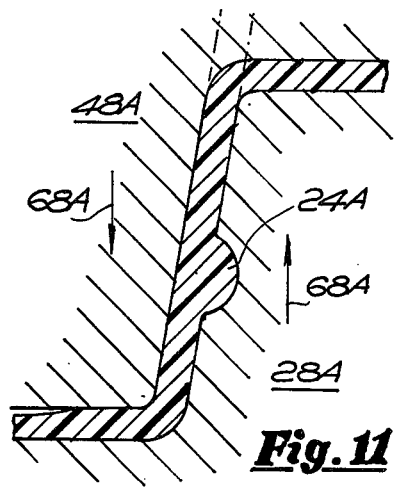

FIGS. 6, 7 and 8 are sectional detailed views showing the steps involved in the formation of the rim of the lid of FIG. 1; and FIGS. 9, 10 and 11 are views similar to FIGS. 6, 7 and 8 showing the steps moulded in the formation of a lid rim of a slightly different configuration.

Figure 2:
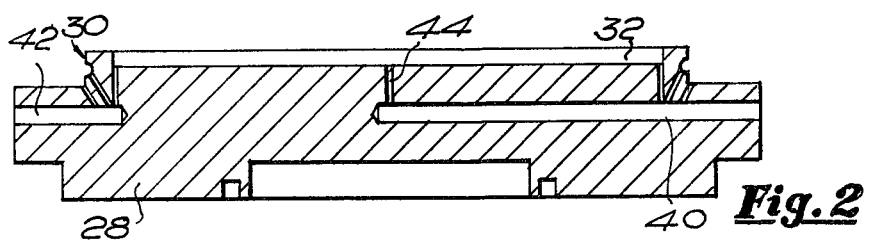
FIGS. 2 and 3 are sectional elevations respectively of male and female clamp mould dies.
Figure 3:
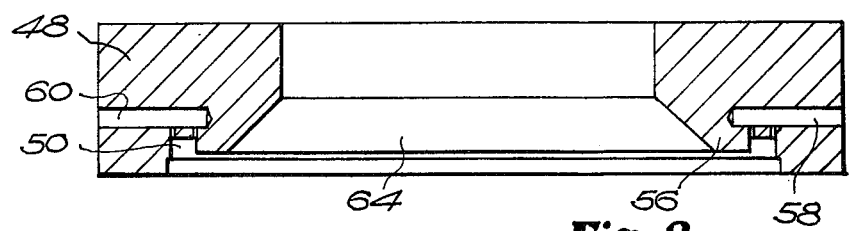

Referring to FIG. 1, in this Figure, there is shown in sectional elevation, a synthetic plastics material lid 10 which has been moulded by the male and female dies shown in FIGS. 2 and 3 in accordance with the present invention. The lid 10 is of circular configuration and the section of FIG. 1 is taken through a diameter. The lid has a central circular top portion 12 which is flat, and integral therewith is a rim portion 14. The rim portion as shown has an upwardly directed inner rim portion 16, a top portion 18 and a downwardly extending outer portion 20. The lid is of constant thickness except for over the axial length of the outer rim portion 20 which is formed in accordance with the method of the present invention. On the outer surface, the rim portion 20 is provided with a shoulder 22, whilst on the inner side it is provided with a catch bead 24. This bead is for catching the top of a tub 26 (indicated in dotted lines in FIG. 1), the top of which is to be closed by the lid 10 whilst the shoulder 22 serves as de-nesting ring on which the adjacent lid of similar configuration rests when the lids are nested one within the other, as shown at 25 in FIG. 1.

Figure 4:
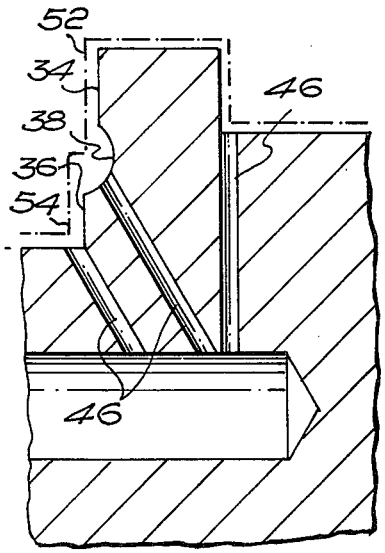
FIGS. 4 and 5 are enlarged fragmentary sectional elevations of the dies shown in FIGS. 2 and 3.
Figure 5:
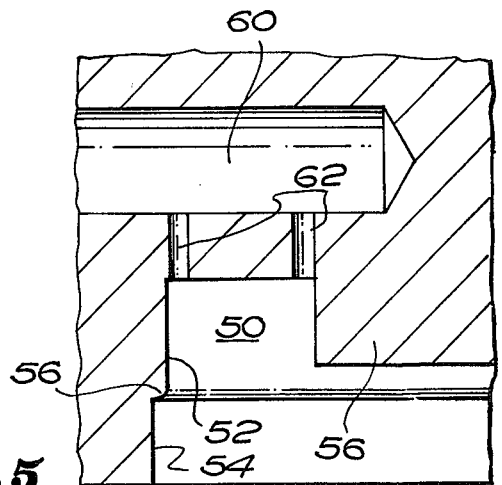

Referring now to FIGS. 2 to 5, and firstly to FIGS. 2 and 5, the male die 28 is of circular section and is provided with a raised circular central portion 30 which has a top recess 32 so as to define a projecting rim which forms the interior of the rim portion 14 in the final component. The outer profile of the central portion 30 is shown in enlarged detail in FIG. 4 and will be seen to comprise two staggered wall regions 34 and 36 lying on different diameters and which are joined by a circular sectioned groove 38, defining the bead cavity for bead 24 as will be explained. The die 28 is bored as at 40 and 42 and is provided with drilled passages 44 and 46 (see FIG. 4) which allow escape of air into the borings 40, 42 during the moulding operation.

The female die as shown in FIG. 3 and 5 is complimentary to the male die of FIGS. 2 and 4. This die, which is referenced 48 in the drawings is also of circular section and is provided with a circular shoulder 56 and a circular groove 50 lying between the outer peripheral wall of the shoulder 56 and an opposing peripheral wall. The outer peripheral wall defining groove 50 as shown clearly in FIG. 5 is made up of two staggered wall portion 52 and 54 which are joined by a shoulder 56, the wall portions 52 and 54 being of different diameter. The inner wall defining groove 50 is defined by a circular shoulder 56. The die 48 is bored at 58 and 60 to allow the venting of air through passage 62 (see FIG. 5) during the moulding operation.

Referring again to FIG. 4, this shows in chain dotted lines, the relative positions of the male die and female die during the moulding operation.

Reference is now made to FIGS. 6, 7, and 8 for an explanation of the moulding operation, at least as concerns the moulding of flange 20.

In the moulding operation, sheet material 66 to be moulded is softened by the action of heat and is then clamped between the two dies 28 and 48 which are brought into the relative positions shown in FIGS. 4 and 8. In this position, the radial spacing between wall portion 34 and wall portion 52 is less than the thickness of the sheet material prior to forming and accordingly, when the dies are brought into this position there is an excess of soft plastics material which is exuded from this region into the enlarged section of the cavity as formed by the grooves 38 and by the staggering of wall portion 54 relative to wall portion 52.

Soft plastics material is re-shaped into the desired section and is subjected to a shearing action between dies 48 and 28 in that the dies are moved relatively together as indicated by arrows 68 in FIGS. 6, 7, and 8. Groove 38 forms bead 24 and shoulder 56 provides the de-nesting shoulder 22. The top panel 12 of the lid is formed by thermoforming e.g. by introducing a gas such as air under pressure through a central opening 64 in the female die 48 in order to press the plastic material onto the base of the recess formed in the raised portion 30 of the male die.

FIGS. 9, 10 and 11 show, similar to FIGS. 6, 7, and 8, how the invention is used to form the flange of a lid similar to flange 20 of the lid of FIG. 1, but having a slightly different configuration. The parts illustrated in FIGS. 9, 10 and 11 have the same reference numerals, as corresponding parts in FIGS. 6, 7, and 8 but with the addition to the suffix A.

The male and female moulds shown in FIGS. 9, 10 and 11 are for producing a frustro-conical flange, and to this end, female mould 48 has a plane frustro-conical face 52A whilst male mould part 28A has a frustro-conical part defined by annular faces 34A and 36A, which are connected by the groove 38A for forming the head 24A. As in the example in FIGS. 6, 7, and 8, the soft plastics material 68A is moulded to a frustro-conical shape having an internal head, in that it is subjected to a shearing action, as indicated by arrows 68A and a squeezing action by virtue of the fact clearance between the frustro-conical faces 52A and 34A and 36A is less than the united thickness of the sheet. This action achieves local extrusion of the plastics material into the groove 38A and form bead 24A.

It will be appreciated that with the embodiments of the invention there is provided a method of shaping plastics material by moulding technique which is not injection moulding, but which nevertheless permits the formation of wall in rim sections which differ in shape on the respective sides of the wall or rim of a particular component. The invention can be applied to deep drawn components and particularly where it is only the top region of such components which requires to be specifically formed by a method of invention.

Whilst in the embodiments of the invention it has been explained that some thermoforming is used this is not strictly necessary.

In the examples described, the clearance between wall portion 34A) and wall portion 52 (or 53A) in the clamped position is approximately 15 thousandths of an inch whereas the sheet material 6 is used is of a thickness of 30 thousandths of an inch. Whilst there is no overall limits of sheet material thickness for this invention we feel that in the domestic container field, the thickness is unlikely to be outside the range of 10 to 60 thousandths of an inch.

The embodiments of the invention as applied to the formation of lids have several disadvantages, in that by this method it is possible to achieve a fairly constant dimension for the catch ring 24 or 24A by forcing the plastics material into the groove 38 or 38A. Where conventional thermoforming techniques are used to form such a catch ring, there can inconsistency in the diameter of the ring.

Furthermore, the provision of a bead 24 or 24A on the flange 20 or 20A can serve to strengthen the outer rim which forms the catch onto the tub which the lid is to close. This makes the feel of the lid, in pulling it from the tub much better. A further advantage of the invention is that there is provided a technique which, although somewhat comparable with pressure forming, nevertheless can provide that the finished component can have a region whose thickness is greater than the initial thickness of the starting material, such technique involving re-shaping the material whilst soft, by a shearing and squeezing action, enabling local extrusion of the material to take place between the dies.

The components may be held in the closed moulds for any desired time to permit the components to be cooled Such cooling may be forced cooling by passing a cooling fluid e.g. air over the mould parts or by passing a cooling liquid through suitably formed cooling passages in the mould parts.

The method can be applied to any form of thermoformable plastics material including polystyrene, P.V.C. Polythelene, polypropylene and so on.

I claim:

1. A method employing male and female dies for molding thermoformable synthetic plastics sheet material into a circular lid having a downturned rim with a bead on its inner face whereby the lid can fit over the top edge of a container with the bead in sealing engagement with the container, the male die having an outer annular wall providing a cavity for forming a bead on the inner face of the downturned rim of the lid and the female die having an inner annular wall for forming the outer surface of the downturned rim, the method comprising the steps of a. softening the sheet material by the application to it of heat whereby the material is in a moldable state, b. disposing the softened sheet material between the dies, c. moving the dies together to cause the softened sheet material to be folded over the male die until the spacing between the inner and outer annular walls is less than the starting thickness of the sheet material whereby the sheet material between the outer and inner annular walls is caused to form the down-turned rim and is subjected to simultaneous compressive and shear forces which cause some of the material of the downturned rim to be forced into the bead cavity of the male die and form the bead on the inner face of the downturned rim of the lid.

2. The molding method according to claim 1, wherein the bead cavity is of spiral form to cause a screw thread to be formed on the wall of the article.

* * * * *